J. W. KALDENBACH.
WHEELWRIGHT MACHINE.
APPLICATION FILED MAY 3, 1910.
978,166.
Patented Dec. 13, 1910.
2 SHEETS—SHEET 2.
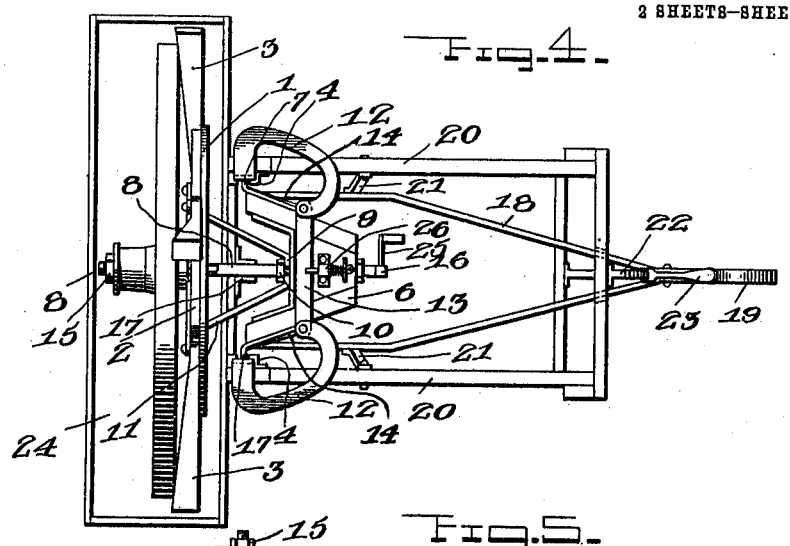
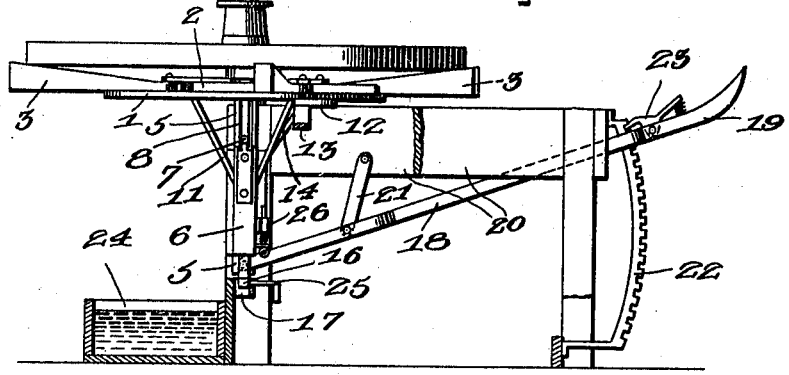
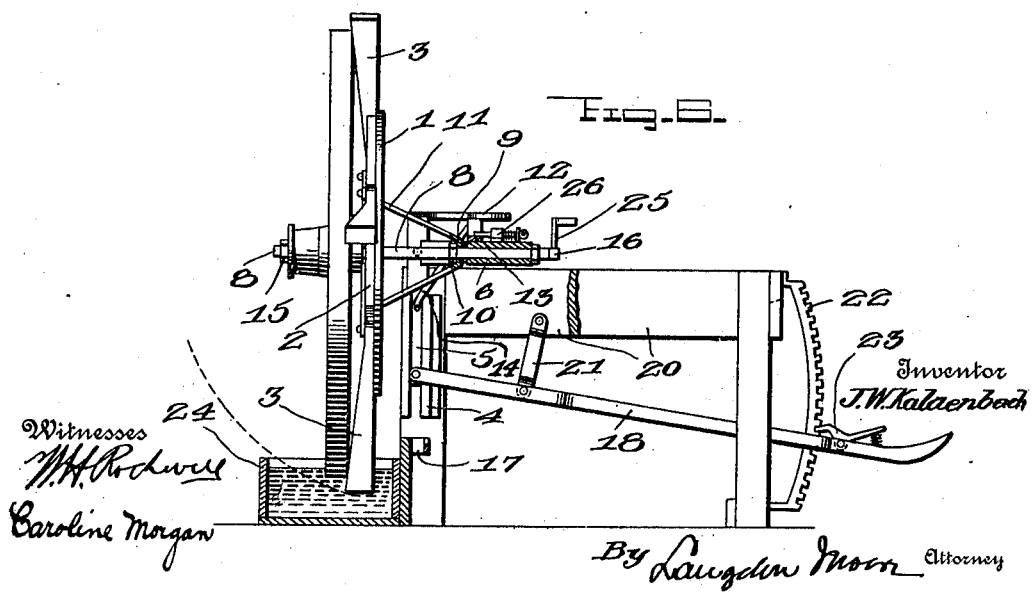

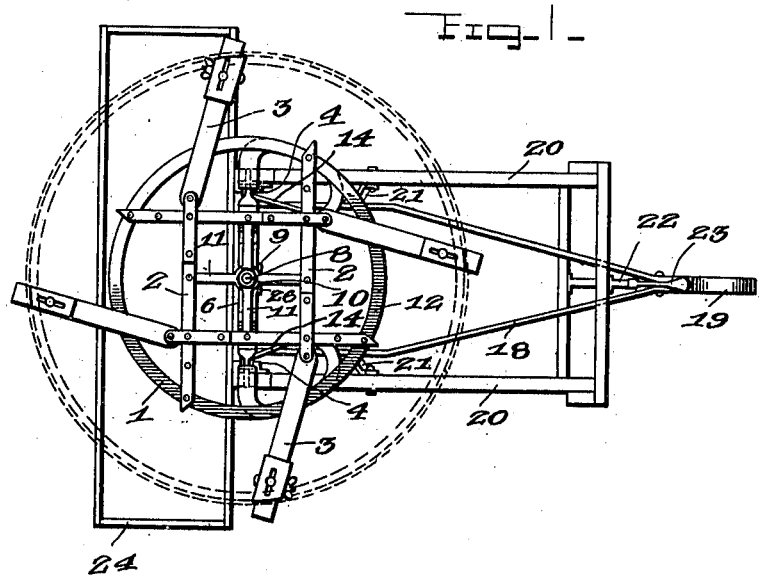

UNITED STATES PATENT OFFICE.

JOHN W. KALDENBACH, OF SEAT PLEASANT, MARYLAND.

WHEELWRIGHT-MACHINE.

978,166.	Specification of Letters Patent.	Patented Dec. 13, 1910.

Application filed May 3, 1910. Serial No. 559,106.

*To all whom it may concern:*

Be it known that I, JOHN W. KALDENBACH, a citizen of the United States, residing at Seat Pleasant, in the county of Prince Georges and State of Maryland, have invented new and useful Improvements in Wheelwright-Machines, of which the following is a specification.

This invention relates to improvements in wheelwright machines, and more particularly to an improved form of tire setting and cooling device.

It is the object of this invention to provide a device of this character in which the wheel may be applied in the horizontal position, the heated and expanded tire placed over the wheel in this position and then the trestle supporting the wheel and tire tilted into a vertical position with the lower portion of the wheel and tire submerged in a tank of water, so the tire may be rapidly cooled upon rotating the wheel within the tank and the tire caused to firmly grip the felly of the wheel. Devices of this character which have heretofore been made disclose the wheel supporting trestle supported upon a framework a considerable distance from the ground, so that when the trestle is tilted the rim of the wheel will enter the water tank. This invention contemplates a relatively low framework for the trestle with means for raising the trestle and wheel carried thereby before tilting into the water tank.

This invention is extremely advantageous where heavy wide tires are to be placed upon the wheel. As the trestle is relatively low, the heated heavy tire may be readily placed thereon without great exertion, because it has to be lifted only a short distance from the ground. Tires of any size may be set upon their respective wheels as the supporting arms of the trestle are adjustable, and as the pivotal point of the trestle may be secured in any position above the tank. After a tire has been placed upon the trestle a single workman can operate the device, as the trestle and wheel are raised above the frame work by a lever which may be locked in the desired position. The water tank being secured to the front of the framework supporting the trestle allows the device to be moved to any desirable place without the preparation of a particular foundation therefor.

While the preferred form of this invention is illustrated in the accompanying sheets of drawings, yet it is to be understood that minor detail changes may be made without departing from the scope thereof.

Figure 1 is a top plan view of the complete device showing the position of the wheel rim and tire in dotted lines. Fig. 2 is a view in end elevation looking upon the left of Fig. 1. Fig. 3 is a view in end elevation looking upon the right on Fig. 1 with part of the frame broken away. Fig. 4 is a top plan view illustrating the trestle in tilted position. Fig. 5 is a view in side elevation with the nearest portion of the framework broken away. Fig. 6 is a view corresponding to Fig. 5 with the trestle raised and in the tilted position.

This invention comprises a pivoted wheel supporting trestle mounted upon a relatively low trestle frame.

The wheel supporting trestle comprises a base ring 1 having two pairs of parallel cross bars 2 mounted at right angles to each other equidistantly from the center of the base ring. One end of each member of the cross bars extends to the ring and is secured thereto. The opposite end of each member of the cross-bars is provided with a pivoted extension 3 adapted to rest upon and move over the upper surface of the base ring.

The trestle supporting frame comprises a rectangular frame work with tracks or guides 4 upon the inner sides of the two forward posts. Sliding members 5 are mounted to reciprocate within the guides 4. A pivot block 6 is mounted between the reciprocating members 5 provided with pivot shafts 7 extending from each side of the top of the pivot block passing through bearings in the upper part of the reciprocating members 5. A rotating shaft 8 passes centrally through the pivot block 6. The wheel supporting trestle is connected with and supported upon the pivot block 6 by a four armed brace member rotatably mounted upon the top of the pivot block with the rotatable shaft passing through the center of the base portion 9 of the brace and secured from longitudinal movement upon the shaft by a positioning nut 10. The four arms 11 of the brace extend upward and are secured to the under side of the four cross bars 2 carried upon the base ring 1.

The upper end 12 of each of the reciprocating members is bent outward at right angles, curved toward the rear following the curvature of the base ring 1 and then brought inward toward the center of the base ring and terminated at a point adjacent the under side of the juncture of the nearest members of the cross bars. The inner ends of these inturned flat horizontal portions of the reciprocating members are secured to each other by a connecting link 13 and the free ends are strengthened by a brace 14 extending downward and engaging the vertical portions of the reciprocating members. The tops of each of the forward posts are notched to receive the pivot pins 7 of the pivot block. The rotating shaft 8 passing through the pivot block 6 extends upward beyond the wheel supporting trestle a sufficient distance to extend beyond the hub of a wheel when placed thereon and its extremity is screw threaded to receive a securing nut 15 for the hub. The rotating shaft 8 extends through the pivot block 6 in the opposite direction and is provided with a positioning nut in contact with the lower portion of the pivot block. The lower extremity of the rotating shaft 8 is provided with a square head 16 adapted to be received within a socket 17 therefor mounted upon a brace connecting the lower portion of the forward posts.

A wishbone operating lever 18 is mounted upon the frame having the forward ends pivotally secured to the lower part of each reciprocating member 5 and extends to the rear under the upper rear brace of the frame with the legs joining in a handle 19 beyond the frame. The legs extend from their extremities rearwardly a short distance parallel with the side braces 20 of the frame and are pivotally connected by pivoted links 21 to the side braces 20. A notched quadrant 22 is mounted upon the rear braces of the frame between the legs of the lever 18 where they join the handle 19, and the handle of the lever is provided with a spring pressed pawl 23 normally adapted to engage in the notches on the quadrant 22, but adapted to be released from engagement therewith when the handle is grasped.

A water tank 24 is secured in front of the frame to the outer side of the front posts. One of the faces of the square head 16 of the lower extremity of the rotating shaft 8 is provided with an outstanding operating handle 25 and the socket 17 for the reception of this end of the shaft is provided with a receiving notch for the handle, so that when the end of the shaft 8 is within the socket, the handle prevents the rotation of the shaft. The inner side of the pivot block 6 is provided with a spring snap catch 26 which is adapted to engage the connecting link 13 between the inturned ends of the reciprocating members 5 when the pivot block is tilted.

In the normal position the handle of the operating lever is raised bringing the reciprocating members into their lowermost position with their out turned upper ends in engagement with the top of the respective supporting posts, the notches in the top of the posts allowing pivot pins of the pivot block to descend therein, the rotating shaft is brought into a vertical position and its lower end received within the socket therefor and held from rotation therein by the outstanding handle being in engagement with the handle notch in the socket. This brings the wheel supporting trestle in a horizontal position with the base ring resting upon and supported by the upper horizontal portions of the reciprocating members.

The wheel is placed in position by passing the hub over the rotating shaft, the pivoted arm of the cross bars are then moved outward until they extend a short distance beyond the rim of the wheel, and the wheel secured in place by a securing nut upon the screw threaded portion of the rotating shaft extending beyond the hub. If desired, the free ends of the pivoted portions of the cross bars may be provided with adjustable metallic plates 27 which may be adjusted to engage the under side of the wheel rim. The metallic tire having been heated until sufficiently expanded is placed over the rim and will rest upon the free ends of the pivoted members extending beyond the wheel rim. If desired, the adjustable metallic plates carried on the free ends of these pivoted members may be so adjusted as to terminate at the outer circumference of the rim and thereby raise the rim above the lower side of the tire when it rests upon the ends of the pivoted members.

When the tire is in place the handle of the operating lever is moved downward which will lift upward the wheel supporting trestle and release the lower end of the rotating shaft from its socket. When the wheel supporting trestle is in its uppermost position, the pivot block is turned upon its pivot until in the horizontal position and its snap catch engages the connecting link of the horizontal portions of the reciprocating members. If the wheel rim and tire is not then submerged in the water tank, the wheel trestle may be lowered into the tank by raising the operating lever. The tire will be quickly and thoroughly cooled by rotating the wheel either by hand or by turning the handle upon the inner end of the rotating shaft. After the tire is entirely cooled, the wheel may be removed from the trestle in this position, or if desired the trestle may be brought into the horizontal position by releasing the snap catch and the wheel may be moved in the uppermost position of the trestle, or the trestle lowered into the original position before removing the wheel.

The frame is just of a sufficient height to allow of the submersion of the rim of a wheel of the smallest size adapted to be carried upon the wheel trestle when the trestle is in its lowermost position. Larger wheels are accommodated upon the wheel trestle by pulling out the pivoted arms of the cross bars and as only the smallest wheels will be submerged within the tank when the trestle is in its lowermost position larger wheels are readily submerged by raising the trestle and then tilting it into the tank as above described.

What I claim is:—

1. In a tire setting and cooling machine, a frame, a water tank, a pivoted wheel trestle, a rotatable wheel securing shaft mounted centrally in the trestle, means to vertically raise the trestle above the frame, and means to engage and secure the wheel shaft from rotation only in the lower position of the trestle.

2. In a tire setting and cooling machine, a frame, a water tank, members mounted to reciprocate vertically upon the frame adjacent the tank, a pivot block pivotally mounted upon the reciprocating members, a wheel trestle supported thereon, a wheel securing shaft passing centrally through the trestle and pivot block rotatably mounted in the pivot block and secured to the trestle support, means to secure a wheel to the trestle on one end of the shaft and a handle on the opposite end beyond the pivot block for rotating the shaft and trestle, and means to operate the reciprocating members.

3. In a tire setting and cooling machine, a frame and a water tank secured thereto, guides upon the vertical posts of the frame adjacent the water tank, vertical sliding members mounted to reciprocate in said guides having their upper portions bent at right angles extending rearwardly thereof and having a link joining their horizontal extremities, means to reciprocate said members in a vertical direction, a pivot block pivotally mounted between the vertical portions and below the angular extensions of the members adjacent the top thereof, a wheel trestle pivotally mounted upon the pivot block adapted to normally rest upon the horizontal portion of the reciprocating members and engage the under side of the link joining the horizontal extremities of the members to one side of the pivotal points of the pivot block to retain it in a horizontal position.

4. In a tire setting and cooling machine, a frame and a water tank secured thereto, guides upon the vertical posts of the frame adjacent the water tank, vertical sliding members mounted to reciprocate in said guides having their upper portions bent at right angles and joined together at their horizontal extremities, means to reciprocate said members in a vertical direction, a pivot block pivotally mounted between the vertical portion and below the angular extension of the members adjacent the top thereof, a wheel trestle pivotally supported upon the pivot block adapted to normally rest upon the horizontal portions of the reciprocating members, a wheel receiving shaft passing centrally through the trestle and pivot block rotatably mounted in the pivot block and secured to the trestle support, means to secure a wheel to the trestle on one end of the shaft and a handle on the opposite end beyond the pivot block for rotating the shaft and trestle, and means to engage the handle and end of the shaft in the lower position to prevent rotation of the shaft.

JOHN W. KALDENBACH.

Witnesses:
   Langdon Moore,
   Walter C. English.